United States Patent
Duan et al.

(10) Patent No.: US 12,152,170 B2
(45) Date of Patent: Nov. 26, 2024

(54) RESIN MODIFIED STARCH ADHESIVE AND PREPARATION METHOD THEREOF

(71) Applicant: Hongsheng Technology (Beijing) Co., Ltd, Beijing (CN)

(72) Inventors: Zhongda Duan, Beijing (CN); Jiafei Yan, Beijing (CN)

(73) Assignee: Hongsheng Technology (Beijing) Co., Ltd, Beijing (CN)

( * ) Notice: Subject to any disclaimer, the term of this patent is extended or adjusted under 35 U.S.C. 154(b) by 62 days.

(21) Appl. No.: 17/071,784

(22) Filed: Oct. 15, 2020

(65) Prior Publication Data
US 2021/0024786 A1    Jan. 28, 2021

(30) Foreign Application Priority Data
Aug. 16, 2019  (CN) .......................... 201910760372.7

(51) Int. Cl.
| | | |
|---|---|---|
| *C09J 103/02* | (2006.01) | |
| *C08L 3/02* | (2006.01) | |
| *C08L 33/18* | (2006.01) | |
| *C08L 63/00* | (2006.01) | |
| *C08L 71/00* | (2006.01) | |
| C08K 3/30 | (2006.01) | |
| C08K 3/32 | (2006.01) | |
| C08K 3/34 | (2006.01) | |
| C08K 5/3472 | (2006.01) | |

(52) U.S. Cl.
CPC .............. *C09J 103/02* (2013.01); *C08L 3/02* (2013.01); *C08L 33/18* (2013.01); *C08L 63/00* (2013.01); *C08L 71/00* (2013.01); C08K 2003/3045 (2013.01); *C08K 3/32* (2013.01); *C08K 3/34* (2013.01); *C08K 5/3472* (2013.01)

(58) Field of Classification Search
CPC .............................. C09J 103/02; C09J 163/00
See application file for complete search history.

(56) References Cited

FOREIGN PATENT DOCUMENTS

| CN | 102732186 B | 12/2013 | |
|---|---|---|---|
| CN | 110437764 A | * 11/2019 | ............. C08B 31/18 |

OTHER PUBLICATIONS

CN 110437764 A (Nov. 12, 2019); machine translation. (Year: 2019).*

* cited by examiner

*Primary Examiner* — Rip A Lee

(57) ABSTRACT

The present disclosure provides a resin modified starch adhesive. The resin modified starch adhesive comprises, by weight, 100 parts of a dry starch, 300-500 parts of deionized water, 20-40 parts of an epoxy resin, 5-10 parts of an azido polyether, 1-2 parts of 3, 5-diamido-1, 2, 4-triazole, 1-3 parts of a cyanoacrylate, 5-10 parts of sodium hypochlorite solution, 3-8 parts of sodium tripolyphosphate, 2-5 parts of hydrotalcite, 3-8 parts of kaolin and 1-4 parts of sodium sulfate. The starch adhesive is prepared by modifying an oxidized starch emulsion with an epoxy resin modified by the azido polyether to introduce reactive functional groups and water-resisting five-membered ring structures, thus the shear strength and the water resistance of the adhesive are greatly improved.

4 Claims, No Drawings

RESIN MODIFIED STARCH ADHESIVE AND PREPARATION METHOD THEREOF

CROSS REFERENCE TO RELATED APPLICATION

This application claims priority of the Chinese Patent Application filed on Aug. 26, 2019, with the application number of 201910760372.7, and the title of "Resin Modified Starch Adhesive and Preparation Method Thereof", the entire contents of which are fully incorporated herein by reference.

TECHNICAL FIELD

The present disclosure relates to the technical field of adhesives, in particular to a resin modified corn starch adhesive for corrugated boards and a preparation method thereof.

BACKGROUND

An early adhesive for corrugated boards is sodium silicate, which is rapid in film formation and low in price and thereby is used by carton factories for a long time. However, cartons adhered by the sodium silicate are prone to water absorption and salt accumulation, thus resulting in damage to surface pressure resistance, degumming occurs occasionally, even corrosive packaged goods and pollute environment. Compared with sodium silicate, a corn starch adhesive developed in 1935 by Stein Hall, an American, has the advantages of high adhesive strength, light weight, non-corrosive, good moisture resistance, high durability, good toughness, easy manufacturing, low cost and the like, and is more applicable to adhesion of corrugated boards. The corn starch adhesive has been widely applied abroad to production of corrugated cartons since the early 1950s, while in China, application of starch adhesive was taken as a key project to be popularized among carton factories in 1984, and Ministry of Foreign Trade expressly stipulated that the adhesive for export cartons shall be corn starch adhesive.

Starch is a homopolymer formed through dehydration and condensation of D-glucose monomers. The order of magnitude of the molecular weight of the starch is $10^6$-$10^7$, and C2, C3 and C6 of every glucose unit are respectively provided with a hydroxyl group, so that every starch molecular chain contains hundreds of thousands or even millions of hydroxyl groups, thus forming a large number of intramolecular and intermolecular hydrogen bonds. The existence of the large number of hydrogen bonds in starch molecules enables starch to meet the requirements for serving as an adhesive. However, the force of the hydrogen bonds is much weaker than that of chemical bonds, causing that the adhesive force of starch fails to meet application requirements.

SUMMARY OF THE INVENTION

The present disclosure provides a resin modified starch adhesive and a preparation method thereof. The solution is specifically as follows:

A resin modified starch adhesive comprises, by weight, 100 parts of a dry starch, 300-500 parts of deionized water, 20-40 parts of an epoxy resin, 5-10 parts of an azido polyether, 1-2 parts of 3, 5-diamido-1, 2, 4-triazole, 1-3 parts of a cyanoacrylate, 5-10 parts of sodium hypochlorite solution, 3-8 parts of sodium tripolyphosphate, 2-5 parts of hydrotalcite, 3-8 parts of kaolin and 1-4 parts of sodium sulfate.

The starch is dry corn starch with the protein content lower than 0.3%. The protein content is controlled to reduce mildew and odor of the adhesive due to protein denaturation, so that the storage life of the adhesive is prolonged and environmental friendliness is improved.

The epoxy resin is epoxy resin E44 with an epoxy value ranging between 0.41 and 0.47.

The azido polyether is hydroxyl-terminated glycidyl azido polyether, of which the structural formula is shown as follows:

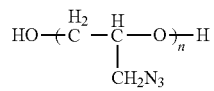

The molecules of the azido polyether contain a large number of hydroxyl groups, which can form hydrogen bonds with hydroxyl groups, carboxyl groups and aldehyde groups in the starch to achieve good association. Meanwhile, the azide groups in the molecules can react with cyanogroups in the cyanoacrylate to produce tetrazole five-membered ring structures, which are high in water absorption resistance.

The cyanoacrylate is alpha-cyanoacrylate with a structural formula of $CH_2=C(CN)-COOCH_3$. The structure contains cyanogroup that can react with the azide groups to produce tetrazole five-membered rings, and the five-membered ring structures improve the water resistance as well as the adhesive strength; the structure also contains reactive hydrogen, which can react with epoxy groups and hydroxyl groups, and further form a cross network together with the oxidized starch, the azido polyether and the epoxy resin, to improve the adhesive strength; besides, the molecular structure further contains ester groups, which has a certain tenacity so that the formed cross network is not excessively hard.

The 3, 5-diamido-1, 2, 4-triazole can be cured with the epoxy resin to achieve a curing effect. Meanwhile, triazole structures can further interact with the water-absorbing groups in the starch such as the hydroxyl groups, the carboxyl groups and the like to prevent the water-absorbing groups from directly interacting with water and accordingly to improve the water resistance of the starch; furthermore, azole groups are good strengthening groups and are beneficial to the strength of colloids. Therefore, the 3, 5-diamido-1, 2, 4-triazole can simultaneously improve the adhesive strength and the water resistance of the adhesive.

The sodium hypochlorite solution is a self-made sodium hypochlorite aqueous solution with the available chlorine content being 5%-10%, and is prepared by inletting chlorine into a 30% sodium hydroxide solution. The sodium hypochlorite solution is alkaline, serves as a catalyst during starch oxidization, and the starch oxidization does not need to be added with additional alkalis.

The kaolin, the hydrotalcite and the sodium sulfate serve as solid fillers and mainly achieve strengthening and drying effects; meanwhile, the hydrotalcite further has certain bacteria and microorganism killing effects to effectively avoid denaturation of the starch adhesive, so that the storage life of the starch adhesive is prolonged.

The sodium tripolyphosphate is high in complexing effects and can be absorbed onto the surfaces of the hydrotalcite, the kaolin and the sodium sulfate to improve the solubility of solid particles.

The preparation method for the resin modified starch adhesive comprises the following steps:

(1) various components are weighed out for standby according to the composition of the formula;

(2) the epoxy resin and the azido polyether are mixed in proportion and sequentially added into a stirring reactor, then absolute ethyl alcohol is added in, the temperature is increased to 50-60° C. and kept to react for 30-40 min, and then the absolute ethyl alcohol is evaporated to obtain an azido polyether modified epoxy resin;

(3) the deionized water is added into a reactor, then the corn starch is added to prepare a 20-30% starch emulsion, the sodium hypochlorite solution is added dropwise, then the temperature is increased to 40-50° C. and kept to react for 2-4 h, after the reaction is completed, 0.1 mol/L of hydrochloric acid solution is added to regulate the pH to 9-10, then the temperature is cooled down to obtain an oxidized starch emulsion; and (4) the modified epoxy resin prepared in step (2), the 3, 5-diamido-1, 2, 4-triazole, the cyanoacrylate, the sodium tripolyphosphate, the hydrotalcite, the kaolin and the sodium sulfate are added proportionally and sequentially into the oxidized starch emulsion prepared in step (3), the mixture is stirred at room temperature and an ultrasonic reaction is performed for 30-50 min to ensure that fillers and the modified resin are uniformly dispersed inside the system;

then the temperature is increased to 60-70° C. and kept to react for 1-2 h, and the temperature is cooled down to obtain a resin modified starch adhesive.

The present disclosure has the advantages that (1) the modified corn starch adhesive prepared with the epoxy resin modified by the azido polyether is high in adhesive strength; (2) the modified adhesive contains the azole five-membered ring structures and accordingly achieve good water resistance; and (3) the adhesive prepared in the present disclosure also achieves good antibacterial and quick-drying effects and thereby has good storage performance as well as good application performance.

DETAILED DESCRIPTION

Because the adhesive strength of starch does not meet the requirements, a large number of uniformly distributed chemical bonds are required to be introduced into starch molecular chains to effectively cooperate with the weak chemical interaction of the surrounding hydrogen bonds so that starch can meet the requirements for adhesive strength. Besides, the large number of hydroxyl groups on the starch molecular chains can very easily form hydrogen bonds with water to result in poor water resistance. Therefore, improving the adhesive strength as well as the water resistance of the starch adhesive is a significant direction of study on the starch adhesive. For example, a modified starch adhesive as disclosed in a Chinese Patent with a patent No. of CN201210241327.9 is added with a high-cohesive-energy component of vinyl acetate, which is highly compatible with the oxidized starch emulsion, to improve the adhesive strength of the starch adhesive; an epoxy resin serves as a crosslinking agent to have crosslinking reaction with the hydroxyl groups of the oxidized starch, thereby significantly improving the water resistance of the starch adhesive. However, to expand the application range of the starch adhesive, development of starch adhesive materials with higher adhesive strength and better water resistance is still required. So the present disclosure provides a resin modified starch adhesive and a preparation method thereof.

The present disclosure will be further described below with reference to embodiments, and the described embodiments are merely a part of embodiments of the present disclosure. On the basis of these embodiments of the present disclosure, equivalent replacements or modifications made by those skilled in the art without any creative efforts should fall within the scope of protection of the present disclosure.

A preparation method for the oxidizing agent sodium hypochlorite solution of the following embodiments comprises, chlorine was imported into a 30% sodium hydroxide solution at 30° C., and 20 min later, a sodium hypochlorite aqueous solution is obtained, of which the available chlorine content is measured to be 6.4%.

In the following embodiments, the azido polyether is hydroxyl-terminated glycidyl azido polyether, the epoxy resin is epoxy resin E44 with an epoxy value of 0.45, and the dry starch is dry corn starch with the protein content being 0.23%.

Embodiment 1

A resin modified starch adhesive comprises, by weight, 100 parts of dry corn starch, 400 parts of deionized water, 35 parts of an epoxy resin, 6 parts of hydroxyl-terminated glycidyl azido polyether, 1 part of 3, 5-diamido-1, 2, 4-triazole, 2 parts of a cyanoacrylate, 6 parts of sodium hypochlorite solution, 4 parts of sodium tripolyphosphate, 4 parts of hydrotalcite, 5 parts of kaolin and 3 parts of sodium sulfate.

(1) various components were weighed out for standby according to the composition of the formula;

(2) 35 g of the epoxy resin and 6 g of the azido polyether were mixed in mass proportion and sequentially were added into a stirring reactor, then absolute ethyl alcohol was added in, the temperature was increased to 50-60° C. and kept to react for 30-40 min, and then the absolute ethyl alcohol was evaporated to obtain 41 g of azido polyether modified epoxy resin;

(3) 400 g of the deionized water was added into a reactor, then 100 g of the corn starch was added to prepare a starch emulsion, 6 g of the sodium hypochlorite solution was added dropwise, then the temperature was increased to 40-50° C. and kept to react for 2-4 h, after the reaction was completed, 0.1 mol/L of hydrochloric acid solution was added to regulate the pH to 9-10, then the temperature was cooled down to obtain an oxidized starch emulsion;

(4) 41 g of the modified epoxy resin prepared in step (2), 1 g of the 3, 5-diamido-1, 2, 4-triazole, 2 g of the cyanoacrylate, 4 g of the sodium tripolyphosphate, 4 g of the hydrotalcite, 5 g of the kaolin and 3 g of the sodium sulfate were added proportionally and sequentially into the oxidized starch emulsion prepared in step (3), the mixture was stirred at room temperature and an ultrasonic reaction was performed for 30-50 min to ensure that fillers and the modified resin were uniformly dispersed inside the system, then the temperature was increased to 60-70° C. and kept to react for 1-2 h, and the temperature was cooled down to obtain a resin modified starch adhesive.

Embodiment 2

A resin modified starch adhesive comprises, by weight, 100 parts of dry corn starch, 380 parts of deionized water, 28 parts of epoxy resin, 5 parts of hydroxyl-terminated glycidyl azide polymer, 1 part of 3, 5-diamido-1, 2, 4-triazole, 1 part of cyanoacrylate, 10 parts of sodium hypochlorite solution, 7 parts of sodium tripolyphosphate, 3 parts of hydrotalcite, 7 parts of kaolin and 4 parts of sodium sulfate.

The preparation method of the resin modified starch adhesive is identical to that in Embodiment 1, and the components are weighed according to this embodiment.

Embodiment 3

A resin modified starch adhesive comprises, by weight, 100 parts of dry corn starch, 450 parts of deionized water, 36 parts of an epoxy resin, 8 parts of hydroxyl-terminated glycidyl azido polyether, 2 parts of 3, 5-diamido-1, 2, 4-triazole, 1.5 parts of a cyanoacrylate, 6 parts of sodium hypochlorite solution, 4 parts of sodium tripolyphosphate, 5 parts of hydrotalcite, 5 parts of kaolin and 2 parts of sodium sulfate.

The preparation method for the resin modified starch adhesive is identical to that in Embodiment 1, and the various components are weighed according to this embodiment.

In order to further validate the technical effects of the present disclosure, a similar adhesive is prepared by referring to an existing patent CN2012102413279, and the specific composition of the adhesive comprises 60 parts of corn starch, 100 parts of deionized water, 30 parts of sodium hypochlorite aqueous solution, 2.5 parts of epichlorohydrin, 60 parts of polyvinyl acetate emulsion, 25 parts of an epoxy resin, 4 parts of tertiary amine catalyst, 5 parts of kaolin, 3 parts of sodium sulfate, 4 parts of talcum powder and 3 parts of titanium dioxide. The adhesive prepared according to the above patent is used as contrast example 1.

The adhesives prepared by the above-described embodiments and the contrast example are respectively subjected to shear strength test according to GB/T9846-2004 and water-resistance shear strength test according to GB/T17657-1999, and specific results are as shown in Table 1.

TABLE 1

Comparison of shear strength properties of the adhesives

| Parameters | Embodiment 1 | Embodiment 2 | Embodiment 3 | Contrast Example 1 |
|---|---|---|---|---|
| Shear Strength MPa | 5.02 | 5.23 | 4.94 | 4.31 |
| Water-resistence Shear Strength MPa | 3.04 | 3.05 | 2.89 | 2.42 |

It can be seen from the data in Table 1 that the adhesive prepared by the present disclosure is obviously better in shear strength and water-resistance shear strength than the prior art. Above described are merely the preferred embodiments of the present disclosure and are not intended to limit the present disclosure, and any modifications, equivalent replacements or improvements made within the spirit and principle of the present disclosure should fall within the scope of protection of the present disclosure.

What is claimed is:

1. A resin modified starch adhesive, comprising, by weight, 100 parts of a dry starch, 300-500 parts of deionized water, 20-40 parts of an epoxy resin, 5-10 parts of an azido polyether, 1-2 parts of 3, 5-diamido-1, 2, 4-triazole, 1-3 parts of a cyanoacrylate, 5-10 parts of sodium hypochlorite solution, 3-8 parts of sodium tripolyphosphate, 2-5 parts of hydrotalcite, 3-8 parts of kaolin and 1-4 parts of sodium sulfate;

wherein, the dry starch is dry corn starch with a protein content lower than 0.3%;

the epoxy resin has an epoxy value ranging between 0.41 and 0.47;

the azido polyether is hydroxyl-terminated glycidyl azido polyether;

the cyanoacrylate is alpha-cyanoacrylate with a structural formula of $CH_2=C(CN)-COOCH_3$.

2. The resin modified starch adhesive according to claim 1, wherein the sodium hypochlorite solution is a self-made sodium hypochlorite aqueous solution with an available chlorine content of 5%-10%.

3. The resin modified starch adhesive according to claim 2, wherein the self-made sodium hypochlorite aqueous solution is prepared by inletting chlorine into a 30% sodium hydroxide solution.

4. A preparation method for the resin modified starch adhesive according to any one of claim 1, comprising the following steps:

(1) weighing out various components by weight composition for standby;

(2) proportionally mixing and sequentially adding the epoxy resin and the azido polyether into a stirring reactor, then adding in absolute ethyl alcohol, increasing temperature to 50-60° C., maintaining the temperature and performing a reaction for 30-40 min, and evaporating absolute ethyl alcohol to obtain an azido polyether modified epoxy resin;

(3) adding the deionized water into a reactor, then adding in dry starch to prepare a 20-30% starch emulsion, dropwise adding in the sodium hypochlorite solution, increasing temperature to 40-50° C., maintaining the temperature and performing a reaction for 2-4 h, after the reaction is completed, adding in 0.1 mol/L hydrochloric acid solution to regulate pH to 9-10, then cooling down the temperature to obtain an oxidized starch emulsion; and (4) proportionally and sequentially adding the azido polyether modified epoxy resin prepared in step (2), the 3, 5-diamido-1, 2, 4-triazole, the cyanoacrylate, the sodium tripolyphosphate, the hydrotalcite, the kaolin and the sodium sulfate into the oxidized starch emulsion prepared in step (3) to obtain a mixture, stirring the mixture at room temperature and performing an ultrasonic reaction for 30-50 min to ensure that fillers and the azido polyether modified epoxy resin are uniformly dispersed inside the mixture, then increasing temperature to 60-70° C., maintaining the temperature and performing a reaction for 1-2 h, and then reducing the temperature to obtain a resin modified starch adhesive.

\* \* \* \* \*